US008656378B2

(12) United States Patent
Gounares et al.

(10) Patent No.: US 8,656,378 B2
(45) Date of Patent: Feb. 18, 2014

(54) MEMOIZATION CONFIGURATION FILE CONSUMED AT COMPILE TIME

(71) Applicant: Concurix Corporation, Kirkland, WA (US)

(72) Inventors: Alexander G. Gounares, Kirkland, WA (US); Ying Li, Bellevue, WA (US); Charles D. Garrett, Woodinville, WA (US); Michael D. Noakes, Burien, WA (US)

(73) Assignee: Concurix Corporation, Kirkland, WA (US)

( * ) Notice: Subject to any disclaimer, the term of this patent is extended or adjusted under 35 U.S.C. 154(b) by 0 days.

(21) Appl. No.: 13/671,816

(22) Filed: Nov. 8, 2012

(65) Prior Publication Data

US 2013/0074055 A1     Mar. 21, 2013

(51) Int. Cl.
*G06F 9/45*     (2006.01)
(52) U.S. Cl.
CPC .................................. *G06F 8/4441* (2013.01)
USPC .......................................... 717/152; 717/151
(58) Field of Classification Search
CPC .... G06F 8/4441; G06F 8/4442; G06F 8/4443
USPC ................................................ 717/151–161
See application file for complete search history.

(56) References Cited

U.S. PATENT DOCUMENTS

| 5,983,021 | A | 11/1999 | Mitrovic |
| 6,553,394 | B1 | 4/2003 | Perry et al. |
| 7,844,958 | B2 * | 11/2010 | Colton et al. ................. 717/146 |
| 8,108,848 | B2 | 1/2012 | Meijer et al. |
| 8,418,160 | B2 * | 4/2013 | Doyle ............................ 717/159 |
| 8,495,598 | B2 | 7/2013 | Gounares et al. |
| 2002/0010891 | A1 | 1/2002 | Klein |
| 2002/0013917 | A1 | 1/2002 | Imbert de Tremiolles et al. |
| 2002/0073053 | A1 | 6/2002 | Tremiolles et al. |
| 2003/0055813 | A1 | 3/2003 | Chaudhuri et al. |
| 2005/0015758 | A1 | 1/2005 | North |
| 2006/0041544 | A1 | 2/2006 | Santosuosso |
| 2006/0155965 | A1 | 7/2006 | Altman et al. |
| 2006/0156257 | A1 | 7/2006 | Chen et al. |
| 2006/0253508 | A1 * | 11/2006 | Colton et al. ................. 707/206 |
| 2008/0115116 | A1 | 5/2008 | Francis et al. |
| 2009/0049421 | A1 | 2/2009 | Meijer et al. |
| 2010/0306746 | A1 | 12/2010 | Barua et al. |
| 2011/0302371 | A1 | 12/2011 | Lysko |

(Continued)

OTHER PUBLICATIONS

Acar et al., "Selective Memoization," Jan. 2003, ACM.*

(Continued)

*Primary Examiner* — Qing Chen
(74) *Attorney, Agent, or Firm* — Russell S. Krajec

(57) ABSTRACT

Memoization may be deployed using a configuration file or database that identifies functions to memoize, and in some cases, includes input and result values for those functions. At compile time, functions defined in the configuration file may be captured and memoized. During compilation or other pre-execution analysis, the executable code may be modified or otherwise decorated to include memoization code. The memoization code may store results from a function during the first execution, then merely look up the results when the function may be called again. The memoized value may be stored in the configuration file or in another data store. In some embodiments, the modified executable code may operate in conjunction with an execution environment, where the execution environment may optionally perform the memoization.

20 Claims, 10 Drawing Sheets

(56) References Cited

U.S. PATENT DOCUMENTS

| | | |
|---|---|---|
| 2011/0320785 A1 | 12/2011 | Chen et al. |
| 2012/0096448 A1 | 4/2012 | Doyle |
| 2012/0185859 A1 | 7/2012 | Kashiwaya et al. |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233592 A1 | 9/2012 | Gounares |
| 2012/0233601 A1 | 9/2012 | Gounares et al. |
| 2012/0317371 A1 | 12/2012 | Gounares |
| 2012/0317389 A1 | 12/2012 | Gounares |
| 2012/0317421 A1 | 12/2012 | Gounares |
| 2012/0317557 A1 | 12/2012 | Garrett |
| 2012/0317577 A1 | 12/2012 | Garrett |
| 2012/0317587 A1 | 12/2012 | Garrett |
| 2012/0324454 A1 | 12/2012 | Gounares et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0117753 A1 | 5/2013 | Gounares et al. |
| 2013/0117759 A1 | 5/2013 | Gounares et al. |
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec et al. |
| 2013/0232174 A1 | 9/2013 | Krajec et al. |
| 2013/0232433 A1 | 9/2013 | Krajec et al. |
| 2013/0232452 A1 | 9/2013 | Krajec et al. |

OTHER PUBLICATIONS

Ziarek et al., "Partial Memoization of Concurrency and Communication," Aug.-Sep. 2009, ACM, p. 161-172.*

International Searching Authority, International Search Report and Written Opinion, Korean Intellectual Property Office, PCT/US2013/040224, Sep. 27, 2013.

Frost, Richard, "Monadic Memoization towards Correctness-Preserving Reduction of Search", In: Proceedings of 16th the Canadian Society of Intelligence Conference on Advances in Artificial Intelligence, pp. 66-80, Jun. 11-13, 2003.

Guo, Philip J, et al., "Using Automatic Persistent Memoization to Facilitate Data Analysis Scripting", In: Proceedings of the 2011 International Symposium on Software Testing and Analysis, pp. 287-297, Jul. 17-21, 2011.

International Search Authority, International Search Report and Written Opinion, Korean Intellectual Property Office, PCT/US2013/039386, Jun. 26, 2013.

International Search Authority, International Search Report and Written Opinion, Korean Intellectual Property Office, PCT/US2013/041138, Sep. 6, 2013.

International Search Authority, International Search Report and Written Opinion, Korean Intellectual Property Office, PCT/US2013/040817, May 13, 2013.

International Search Authority, International Search Report and Written Opinion, Korean Intellectual Property Office, PCT/US2013/041151, Aug. 23, 2013.

International Search Authority, International Search Report and Written Opinion, Korean Intellectual Property Office, PCT/US2013/040183, Aug. 1, 2013.

International Search Authority, International Search Report and Written Opinion, Korean Intellectual Property Office, PCT/US2013/041030, Aug. 21, 2013.

International Search Authority, International Search Report and Written Opinion, Korean Intellectual Property Office, PCT/US2013/041128, Aug. 21, 2013.

Mostow, Jack, et al., "Automated Program Speedup by Deciding What to Cache", In: Proceedings of the 9th International Joint Conference on Artificial Intelligence, vol. 1, pp. 165-172m 1985.

Rito, Hugo et al., "Memoization of Methods Using Software Transactional Memory to Track Internal State Dependencies", In: Proceedings of the 8th International Conference on the Principles and Practice of Programming in Java, pp. 89-98, Sep. 15-17, 2010.

Xu Haiying et al., "Dynamic Purity Analysis for Java Programs", In: Proceedings of the 7th ACM SIGPLAN-SIGSOFT workshop on Program Analysis for Software Tools and Engineering, pp. 75-82, Jun. 13-14, 2011.

* cited by examiner

MEMOIZATION CONFIGURATION FILE CONSUMED AT COMPILE TIME

BACKGROUND

Memoization is an optimization technique for speeding up computer programs by caching the results of a function call. Memoization avoids having a function calculate the results when the results may be already stored in cache. In cases where the function call may be computationally expensive, memoization may drastically reduce computation time by only performing a specific calculation one time.

Memoization may add overhead to a program. The overhead may include testing a cache prior to executing a function, plus the overhead of storing results.

SUMMARY

Memoization may be deployed using a configuration file or database that identifies functions to memorize, and in some cases, includes input and result values for those functions. At compile time, functions defined in the configuration file may be captured and memoized. During compilation or other pre-execution analysis, the executable code may be modified or otherwise decorated to include memoization code. The memoization code may store results from a function during the first execution, then merely look up the results when the function may be called again. The memoized value may be stored in the configuration file or in another data store. In some embodiments, the modified executable code may operate in conjunction with an execution environment, where the execution environment may optionally perform the memoization.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
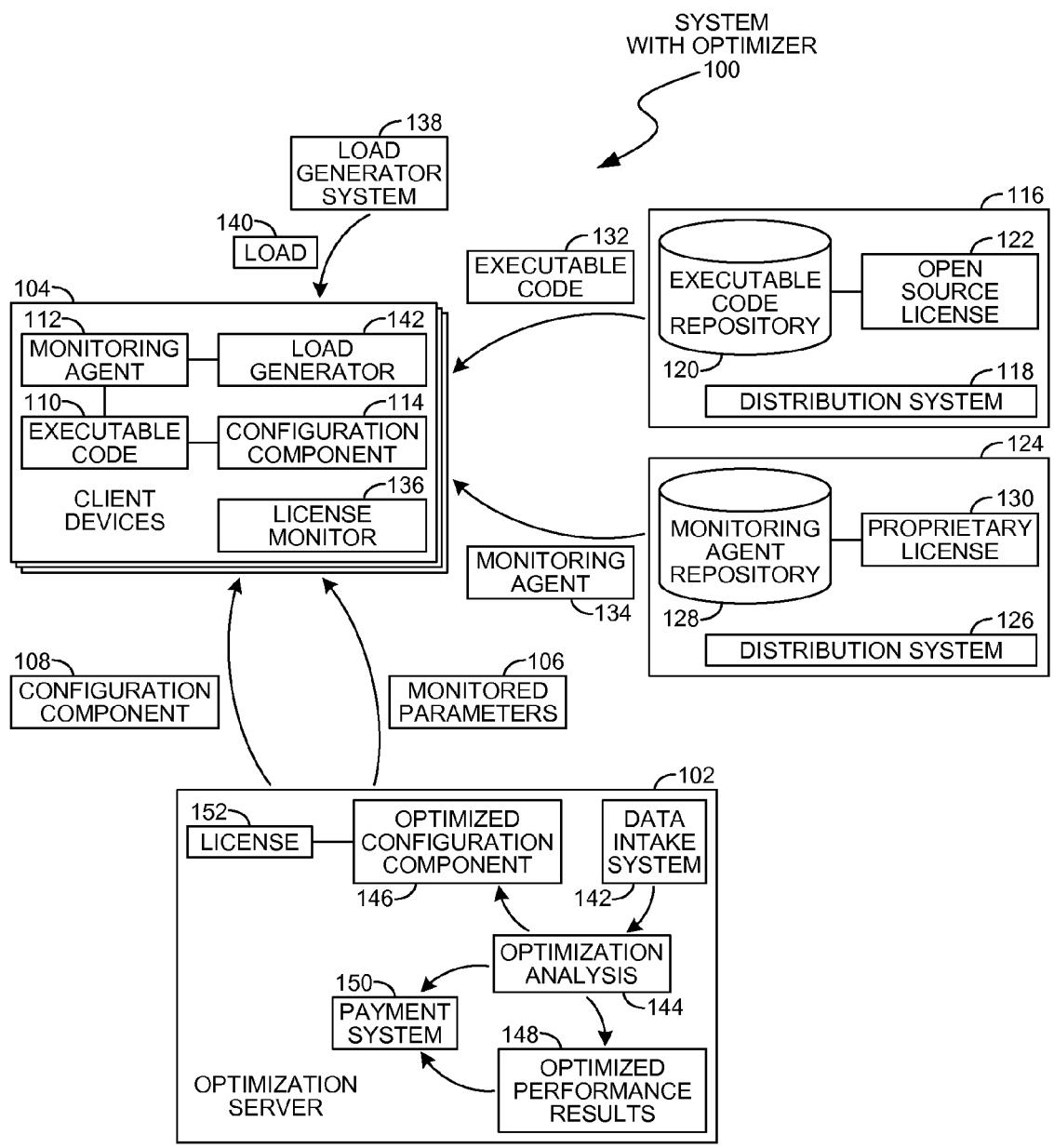
FIG. 1 is a diagram illustration of an embodiment showing a system with an optimizer.

During compiling or other pre-execution analysis, a function may be decorated or otherwise modified to perform memoization. The memoization may be defined in a configuration file or other database, which may be created by prior analysis of an application containing the function.

The application may be decorated in several different manners. In one embodiment, the application code may undergo an analysis prior to memoization to identify functions to memoize. The analyses may be static or dynamic analyses, and may use various optimization algorithms to select functions for memoization. The output of the analyses may be a configuration file that may be consumed by a compiler or other pre-execution processor to implement the memoization.

An execution environment may memoize functions by using a configuration database or file that contains function identifiers. During execution, the execution environment may capture a function call and may look up the function in a configuration file. If the function may be listed as a memoizable function in the configuration file, the execution environment may memoize the function.

An offline memoization optimization mechanism may improve performance of a target executable code by monitoring the executing code and offline analysis to identify functions to memoize. The results of the analysis may be stored in a configuration file or other database, which may be consumed by an execution environment to speed up performance of the target executable code.

The configuration file or database may identify the function to be memoized and, in some cases, may include the input and output values of the function. The execution environment may monitor execution of the target code until a function identified in the configuration file may be executed. When the function is to be executed, the execution environment may determine if the input values for the function are found in the configuration file. If so, the execution environment may look up the results in the configuration file and return the results without executing the function.

In some embodiments, the configuration file may be used without changing the target code, while in other embodiments, the configuration file may be used to decorate the target code prior to execution. Some such embodiments may decorate the target code by adding memoization calls within the target code, which may be source code, intermediate code, binary executable code, or other form of executable code.

The offline analysis may perform cost/benefit optimization to determine an optimized set of functions to memoize. In many such analyses, a limited amount of cache space may be available, so the analysis may identify only a subset of memoizable functions that give the greatest benefit within the constraints. One factor in such an optimization may be the frequency of use of the function, or hit rate, which may only be determined through monitoring the dynamic operation of the executable code over time.

The offline analysis may use monitoring results of the target code over multiple instances of the target code. In some cases, the target code may be executed on multiple different devices, and the aggregated results may be analyzed when creating the configuration file. In some cases, the monitoring results may be collected from many different users under many different conditions.

Throughout this specification and claims, the term "configuration file" is used to denote a database that may be consumed by an execution environment. In some cases, the "configuration file" may be an actual file managed within an operating system's file system, but in other cases, the "configuration file" may be represented as some other form of database that may be consumed by the execution environment. The term "configuration file" is used as convenient description but is not meant to be limiting.

The optimization process may use data gathered by monitoring the target code during execution. The monitoring operation may passively or actively collect parameter values, then pass the collected data to a remote optimization system.

The remote optimization system may create a configuration file based on the data received from the monitored target code. In some embodiments, a baseline performance level may be identified prior to executing with the configuration file, then a performance level with the configuration file may be either measured or estimated.

A business model associated with the optimization system may include charging money for the memoization service. In some cases, the memoization service may be a charge that is separate to the cost of the target code software product itself. The charge for the memoization service may be made on the basis of the number of devices or processors that may execute using the configuration file, the amount of performance improvement achieved by memoization, or other factors. In some cases, the optimization service may be charged based on the amount of computation performed by the service to determine the configuration file.

In some cases, the target software product may be distributed under an open source or free software license. In such cases, the software product may be distributed for little or no money. However, the memoization service and in some cases the monitoring agent may be distributed or used for a fee. When the memoization service is distributed as an on-premise application, the memoization service may be distributed under a proprietary license.

In many embodiments, data may be collected when the target executable code is run to determine dynamic and operational monitored parameters. Monitored parameters collected from the target code will not include any personally identifiable information or other proprietary information without specific permission of the user. In many cases, many optimized configurations may be generated without knowledge of the workload handled by the executable code. In the case where the monitoring occurs in an execution environment such as an operating system or virtual machine, the monitoring may collect operating system and virtual machine performance data without examining the application or other workload being executed. In the case where the monitoring occurs within an application, the monitoring may collect operational and performance data without collecting details about the input or output of the application.

In the case when data may be collected without an agreement to provide optimization, the collected data may be anonymized, summarized, or otherwise have various identifiable information removed from the data.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with an optimizer. Embodiment 100 is a simplified example of a system where executable code may be obtained through one distribution system with one license, and a monitoring agent may be distributed through a second distribution system and with a second license. A remote optimization server may create optimized configuration components that may increase the performance of the executable code.

An optimization server 102 may interact with client devices 104 to receive monitored parameters 106 and create an optimized configuration component 108. The configuration component 108 may be used by the client devices 104 to increase performance in some manner.

In one use scenario, the client devices 104 may be executing an executable code 110, where the executable code 110 may be an operating system, process virtual machine, or other execution environment. In general, operating systems, virtual machines, and the like may be configured to execute generic applications, but may not be optimized for any specific workload. The workloads run by the execution environment may vary tremendously, and the optimization server 102 may create a configuration component 108 that may be tailored to the specific workloads experienced by the execution environment.

In some embodiments, the executable code 110 may be an application, which may perform any type of operation, from entertainment such as a game or media distribution, to enterprise or desktop applications that perform business related functions. Such an application may execute within an execution environment such as a process virtual machine, operating system, framework, or other environment. In some embodiments, the executable code 110 may comprise both an application and the execution environment in which the application may execute.

For example, the executable code 110 may be an execution environment within a computer datacenter. The client devices 104 may be assigned a specific workload, such as operating a front end web server. One or more of the client devices 104 may be monitored using a monitoring agent 112 to collect performance data as part of the monitored parameters 106. The optimization server 102 may analyze the monitored parameters 106 to generate a configuration component 114 that is optimized for the workload of a front end web server. When installed, the configuration component 114 may cause the execution environment to execute the workload with improved performance.

In many cases, the optimization may attempt to optimize for a specific type of performance. For example, an optimization may emphasize throughput, while another optimization may emphasize response time or latency. While both throughput and latency are metrics of performance, the type of desired performance may be determined automatically by analyzing the monitored parameters 106 or defined explicitly by a user. In some cases, the optimized configuration component may configure the executable code 110 for extreme workload changes or other abnormalities that may cause problems during execution.

The monitored parameters 106 may include any data, metadata, or other information about the executable code 110. A monitoring agent 112 may collect some of the monitored parameters 106 while the executable code 110 operates.

The monitoring agent 112 may operate with a load generator 142. The load generator 142 may create an artificial load on the executable code 110 to generate some of the monitored parameters. The artificial load may cause the executable code 110 to be exercised in various scenarios, such as extreme load conditions, so that an optimized configuration component 108 may avoid conditions that may be unwanted.

The load generator 142 may be an internal version of a remote load generator system 138 that may be generate an external load 140. The load generator 142 may generate any type of load that the executable code 110 may experience, including network traffic, various inputs, and other items that the executable code 110 may experience in either routine or extreme cases.

For example, a monitoring agent 112 may be monitoring executable code 110 that may be an application that processes data from a network connection. The monitoring agent 112 may configure a local load generator 142 or a remote load generating system 138 to generate a load 140 that may simulate scenarios such as a denial of service attack, a high steady state of requests, bursty traffic, randomized traffic, or other scenarios. During the artificially created scenarios, the monitoring agent 112 may collect performance and other data.

In the example, the monitored parameters 106 may be analyzed to identify conditions to which the executable code 110 does not respond well. The configuration component 108 may be generated that defines boundary conditions in which the executable code 110 may be run safely. In some cases, the configuration component 108 may include safeguards or other components that may enable the executable code 110 to handle or avoid the extreme conditions.

In many cases, the optimization server 102 may create a mathematical model of the executable code 110 or the client device 104, and the mathematical model may be used in the optimization process. When a load generator 142 is present, the load generator 142 may trigger generation of the monitored parameters 106 that may enable a more complete mathematical model than if the load generator 142 were not used. This may be because the optimization server 102 may receive data from a wider range of conditions than if the executable code 110 were run under normal conditions.

The optimization server 102 may have a data intake system 142 that may communicate with the monitoring agent 112 to receive the monitored parameters 106. An optimization analysis 144 may analyze the monitored parameters 106 to determine an optimized configuration component 146, which may be transmitted to the client devices 104.

The executable code 110 may be distributed by a distribution system 116, which may have a distribution application 118 which may distribute from an executable code repository 120. In some embodiments, the monitoring agent 112 may be distributed from a different distribution system 124, which may have a distribution application 126 which may distribute from a monitoring agent repository 128.

In the example of embodiment 100, the executable code 110 and the monitoring agent 112 may be distributed from two different sources. Other embodiments may distribute both the executable code 110 and the monitoring agent 112 in the same distribution mechanism.

The executable code 110 may be distributed using an open source license 122. An open source license 122 may be one of many licenses where a software product may be distributed with source code. In some cases, the open source license may have minimal restrictions on how the software may be modified and redistributed. In other cases, the open source license may be written so all subsequent users receive the same rights. Such licenses may be known as 'copyleft' licenses.

Some open source licenses may be commercial open source licenses. Commercial open source licenses may make the open source of a software product available for non-commercial uses, but may restrict the commercial uses of the product. In some embodiments, a commercial user may be permitted to evaluate the product or even use the product in a limited fashion, but would obtain a license for further commercial use outside of the defined limits.

Some open source licenses, including commercial open source licenses, may grant the user a limited license to the software product along with any patents for which the licensor may have that cover the product. In such a licensing arrangement, the license may give the user the freedom to operate under the licensing terms, but may allow the licensor to enforce the license under patent laws if the product was misused or misappropriated.

In some cases, some of all of the monitoring agent 112 may be distributed under an open source license. In such cases, the monitoring agent 112 may be integrated into the executable code 110 in some form. In one embodiment, the executable code 110 may have modifications to collect data, where the data collection modifications are distributed under an open source license. The monitoring agent 112 may include a proprietary-licensed service that separately packages and transmits the data to the optimization server 102.

The monitoring agent 112 may collect data, but may also provide a first level of analysis and reporting to an administrative user. In such embodiments, the monitoring agent 112 may display visualizations of the data in the form of graphs, charts, dashboards, or other user interface components.

The monitoring agent 112 may analyze the collected data to determine whether the executable code 110 may be operating in an optimal fashion. The monitoring agent 112 may have several parameters that may be tracked, and when one or more of the parameters falls outside of a predefined boundary, the monitoring agent 112 may indicate that operations may be sub-optimal. In some cases, the monitoring agent 112 may send an alert to an administrator. In some cases, the monitoring agent 112 may cause the monitored parameters 106 to be transmitted to the optimization server 102 to generate an optimized configuration component.

The monitoring agent 112 may be capable of recognizing that a change to the workload of the executable code 110 has occurred and that a new configuration component 108 may be appropriate. In many cases, the configuration component 108 may be tailored for a specific workload. As the workload changes, the configuration component 108 may be less optimal, which may trigger the monitoring agent 112 to cause an optimization process to occur.

The monitoring agent 112 may prepare data for the optimization server 102. In some cases, the monitoring agent 112 may sample, aggregate, or otherwise condense data for transmission.

The configuration component 108 may include static parameters or executable code that may improve the performance or otherwise optimize the executable code 110. In some cases, the configuration component 108 may include settings, parameter values, or other static information that may cause the executable code 110 to operate differently.

In other cases, the configuration component 108 may include binary code, intermediate code, source code, or other type of instructions that may operate with the executable code 110. When the configuration component 108 includes executable instructions, that executable instructions may operate within, on top of, or in conjunction with the executable code 110. Instructions that operate within the executable code 110 may be derived from the code base of the executable code 110 and may be distributed under the same licensing scheme as the executable code 100 when such licensing scheme demands. In some cases, such instructions may be distributed under a different licensing scheme, such as a proprietary licensing scheme.

Executable instructions that operate on top of the executable code 110 may be, for example, an application executed by the executable code 110. Such instructions may be distributed using an open source license, proprietary license, or some other licensing scheme.

Executable instructions that operate in conjunction with the executable code 110 may be, for example, an application that executes separately from the executable code 110. Such instructions may be distributed using an open source license, proprietary license, or some other licensing scheme.

The optimization server 102 may be capable of providing different types of optimization based on a subscription or other purchase by a user customer. For example, a subscription or purchase at one level may provide improved or optimized static settings for a particular workload experienced by the executable code 110. A second level purchase may include both static settings as well as executable instructions for a subset of available optimizations. Third or fourth level purchases may include additional available optimizations.

The optimizations may include executable instructions that are tailored to a specific workload. For example, an executable code 110 that performs a generic task repeatedly may be optimized with a highly optimized form of the task.

In some cases, an optimization may remove or disable portions of the executable code 110. For example, the executable code 110 may include a mechanism that checks for certain conditions, but when those conditions are fixed or very rarely changed, the optimization may remove the mechanism and the associated checks. In some cases, the optimization may remove portions of the executable code 110 and replace the removed portions with different code.

A payment system 150 may collect monies and ensure that a transaction may be authorized prior to proceeding. In the example of a pay-per-use model, each time a set of monitored parameters 106 are transmitted to the optimization server 102, the payment system 150 may permit the optimization to proceed. The payment system 150 may permit optimization when the customer has paid in advance, has sufficient credit, has provided a credit card, or made other arrangements for payment.

In some embodiments, the payment may be based on the amount of optimization that may be achieved. For example, a baseline performance metric may be made by the monitoring agent 112 prior to optimization. After optimization, the monitoring agent 112 may determine a post-optimization performance metric. The pricing may be based at least in part by the increase in performance. In some such embodiments, the optimization server 102 may estimate the performance increase and pricing may be determined using the estimated performance increase.

Figure 2:
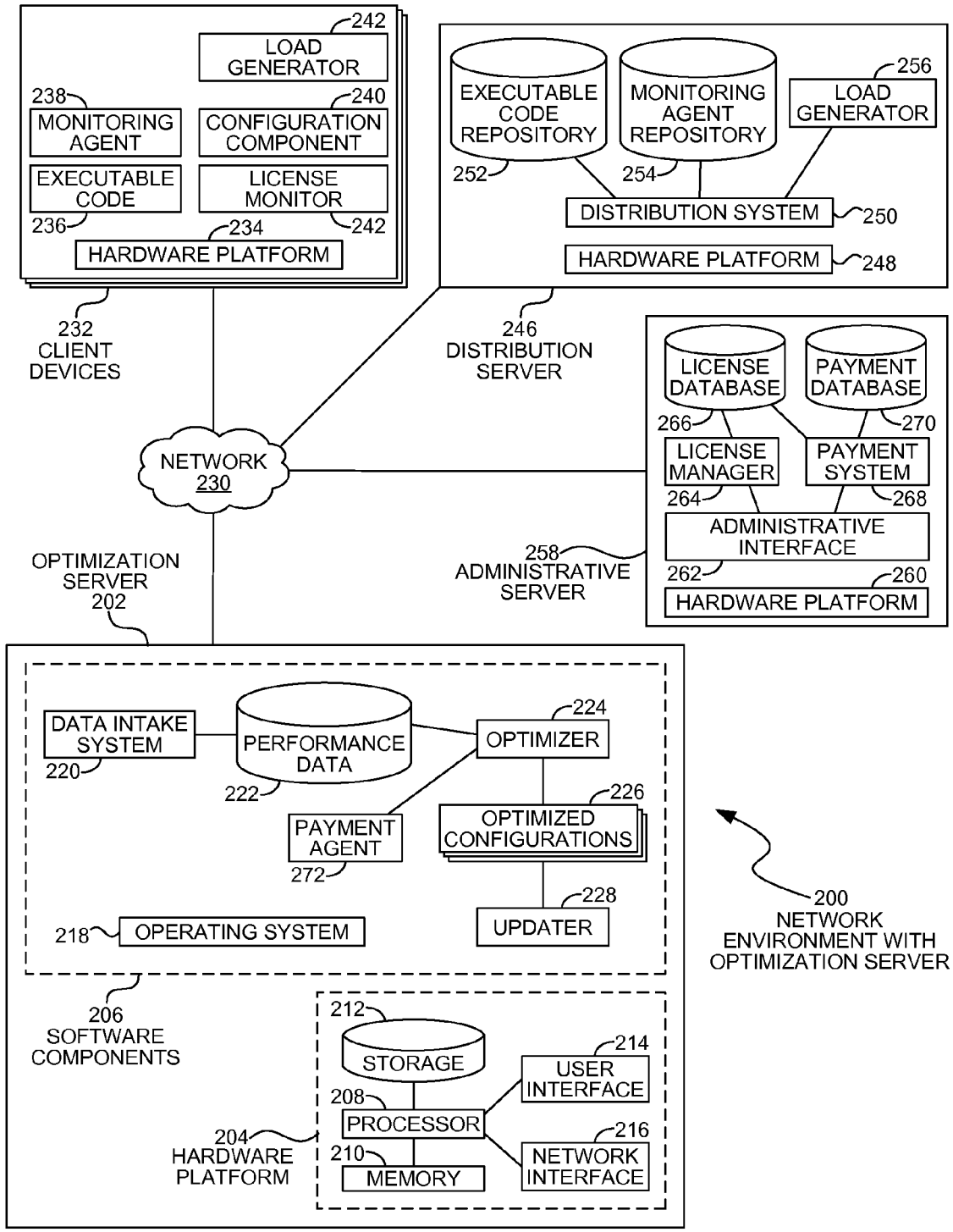
FIG. 2 is a diagram illustration of an embodiment showing a network environment with an optimization server.

FIG. 2 is a diagram of an embodiment 200 showing a computer system with a system with an optimization server. Embodiment 200 illustrates hardware components that may deliver the operations described in embodiment 100, as well as other embodiments. Embodiment 200 illustrates a network environment in which the various components may operate.

Various devices may be connected via a network 230 to communicate with each other. The network 230 may be a local area network, wide area network, the Internet, or some other network.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the optimization server 202 may be a server computer. In some embodiments, the optimization server 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various applications 244 and services may operate. An operating system may provide an abstraction layer between executing routines and the hardware components 204, and may include various routines and functions that communicate directly with various hardware components.

The optimization server 202 may have a data intake system 220 which may receive monitored parameters from one or many client devices 232 and store the monitored parameters in a performance database 222. The performance database 222 may contain a wide variety of data gathered from various client devices 232.

An optimizer 224 may analyze the performance database 222 to generate optimized configurations 226 for the client devices 232. When an optimized configuration 226 is created for a specific client device 232, an updater 228 may transmit the optimized configuration 226 to the client device 232.

In some embodiments, the optimizer 224 may create a mathematical model of the executable code 236, then determine an optimized configuration 226 using the mathematical model. In other embodiments, the optimizer 224 may be a set of predefined rules, heuristics, algorithms, or other expressions that may generate the optimized configuration 226. In some cases, the optimized configurations 226 may be created by a manual analysis and testing method and stored for use when predefined conditions may be met. The optimized configurations 226 may also be helped by human interaction and insight given to the optimizer 226 during an iterative process.

The optimized configurations 226 may be deployed by an updater 228, which may distribute the optimized configurations 226 to the client devices 232. The updater 232 may distribute the configuration components to the devices 232 using a push distribution system, a pull distribution system, subscription distribution system, or some other distribution mechanism.

The client devices 232 may operate on a hardware platform 234 which may be similar to the hardware platform 204. The client devices 232 may be server computers, desktop computers, game consoles, tablet or slate computers, portable devices such as mobile telephones and scanners, or any other type of computing device.

The client devices 232 may run the executable code 236, along with a monitoring agent 238 and the optimized configuration component 240. When the executable code 236 is deployed, the configuration component 240 may be a default or standard-issue configuration component. The monitoring agent 238 may transmit monitored parameters to the optimization server 202 and receive an updated and optimized configuration component 240.

A load generator 242 may be present on the client devices 232 to generate a set of synthesized workloads for the executable code. The synthesized workload may generate monitored data for various conditions. The monitored data may be a wider range of data than might be generated during normal use.

A license monitor 244 may be a component that may assist in compliance monitoring for licensing and payment. In some cases, the license monitor 244 may permit or deny access to the configuration component 240, the executable code 236, the load generator 242, or the monitoring agent 238. In other cases, the license monitor 244 may monitor activities by the client devices 232 to generate invoices or charge the user.

A distribution server 246 may be a mechanism to distribute various executable components to the client devices 232. The distribution server 246 may operate on a hardware platform 248 that executes a distribution system 250. The distribution system 250 may distribute code from an executable code repository 252, a monitoring agent repository 254, and a load generator 256.

A client device 232 may interact with the distribution system 250 to request and download any of the executable components such as the executable code 236, the monitoring agent 238, and the load generator 242. In some embodiments, some of the executable components may be distributed under open source license schemes while other components may be distributed under proprietary license schemes.

An administrative server 258 may interact with the client devices 232 and distribution server 246 to administer licenses and billing/payment services. The administrative server 258 may execute on a hardware platform 260 and provide an administrative interface 262 that may be accessed by a user.

The administrative interface 262 may include access to a license manager 264 that accesses a license database 266. The license manager may allow a user to sign up and purchase a license. In some cases, a license key or other component may be issued to the user and may operate with a license monitor 244 to permit or deny access to the various executable components. In some cases, the license key or other component may be used by executable components on the client devices 232 to gain access to the optimization server.

For example, the license manager 264 may issue a key that may be included in each request to the optimization server 202. The key may authenticate and identify the requesting client device 232. The optimization server 202 may transmit the key to the administrative server 258 and receive approval to proceed. In cases where the payments may be made on a pay-per-use basis, the administrative server 258 may log the uses and charge the user's account.

A payment system 268 may track usage, generate invoices, and perform other payment functions. The payment system 268 may use a payment database 270 to track the various payment functions.

Figure 3:
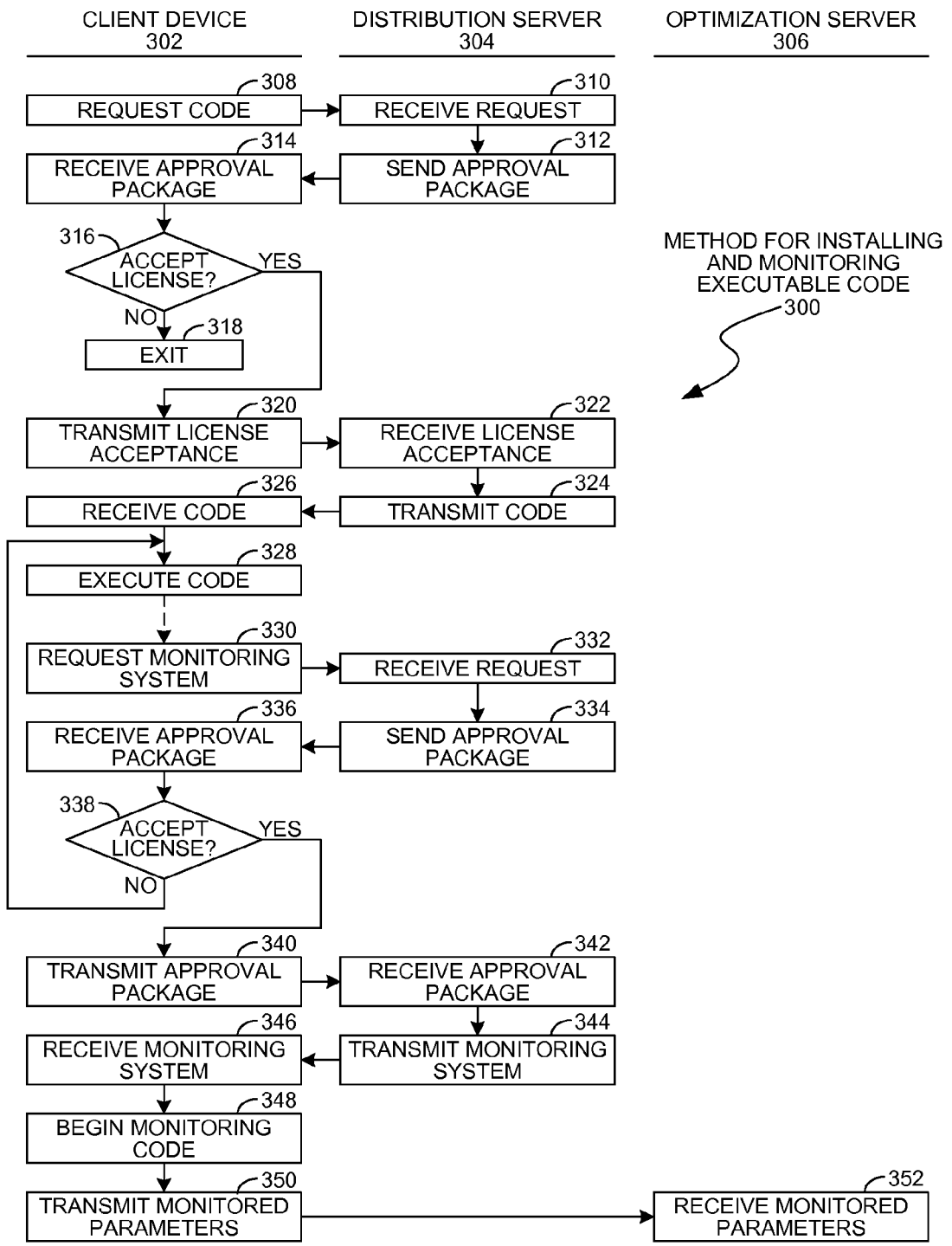
FIG. 3 is a flowchart illustration of an embodiment showing a method for installing and monitoring executable code.

FIG. 3 is a flowchart illustration of an embodiment 300 showing a method for installing and monitoring executable code. Embodiment 300 illustrates the operations of a client device 302 in the left hand column, a distribution server 304 in the center column, and an optimization server 306 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The optimization system of embodiments 100 and 200 may permit several different licensing and payment schemes to be implemented. Embodiment 300 may illustrate merely one of those schemes, where the executable code may be received and licensed in one operation and a monitoring and optimization mechanism may be used and licensed in a separate operation.

Another embodiment may have the monitoring mechanism included with the executable code. In such embodiments, a user may opt in or out of the monitoring operations. Such optional monitoring mechanisms may allow the user to contribute to the development of the executable code by allowing the code developers to collect some operational data regarding the code.

Monitored parameters collected from the executable code will not include any personally identifiable information or other proprietary information without specific permission of the user. In many cases, many optimized configurations may be generated without knowledge of the workload handled by the executable code. In the case where the monitoring occurs in an execution environment such as an operating system or virtual machine, the monitoring may collect operating system and virtual machine performance data without examining the application or other workload being executed. In the case where the monitoring occurs within an application, the monitoring may collect operational and performance data without collecting details about the input or output of the application.

In the case when data may be collected without an agreement to provide optimization, the collected data may be anonymized, summarized, sanitized, or otherwise have various identifiable information removed from the data.

Some monitoring mechanisms may have different levels of monitoring. For example, a developer mode may include comprehensive, heavyweight monitoring that collects large amounts of data for analysis, as well as a lightweight, simple monitoring system that may collect far less data. In such cases, the lightweight and heavyweight monitoring mechanisms may have different cost structures.

For example, a heavyweight monitoring and optimization may be used by developers and may be charged a higher amount than lightweight monitoring service that may be used by administrators who administer large numbers of devices. In such an example, the heavyweight monitoring service may be a fine grained monitoring system that collects very detailed information, and the lightweight monitoring system may be a coarse grained monitoring system that aggregates data or otherwise provides less detailed results. In some such embodiments, the heavyweight monitoring system may monitor some parameters that are not monitored with a lightweight monitoring system.

A heavyweight monitoring system may be used for data collection for certain types of optimizations that may not be possible with lightweight monitoring. For example, a heavyweight monitoring system may measure individual processes, memory calls, network packets, or other details that may be analyzed to determine an optimized configuration of an application. In contrast, a lightweight monitoring system may measure the total processor, memory, and network usage which may be used for identifying bottlenecks in the system but may not be useful for identifying specific processes or memory objects that may result in the bottleneck.

In cases where heavyweight monitoring is used, a user may give explicit permission for collection of information that may be sensitive or proprietary. The sensitive or proprietary information may include data or other inputs and outputs to the executable code being monitored. In such cases, the organization that receives the sensitive or proprietary information may agree to handle the collected data accordingly. For example, such data may be stored and accessed according to the sensitive nature of the information, such as storing the data for a temporary period of time and giving access only to those persons who have a need-to-know.

Embodiment 300 illustrates one method of handshaking and communication by which a user may download and install executable code and a monitoring agent on a client device. The executable code may be deployed under one license scheme and the monitoring agent under a second license scheme. For example, the executable code may be deployed under an open source scheme while the monitoring agent may be deployed under a proprietary scheme.

Embodiment 300 may illustrate a mechanism by which a user may elect to download and deploy the executable code separate from the monitoring system. In an example of such a scenario, a user may choose to use the open sourced executable code without the monitoring. The user may then operate the executable code in its default or standard configuration, and may forego the optimization.

Continuing with the scenario, a user may be able to enjoy the optimized version of the executable code but by only after accepting the license arrangement and paying for the optimization. The optimization may be provided under a second licensing scheme, such as a proprietary licensing scheme.

The client device 302 may request the executable code in block 308, and the request may be received by the distribution server 304 in block 310. Before sending the executable code, the distribution server 304 may transmit an approval package in block 312, which may be received by the client device 302 in block 314.

The approval package may be any type of transmission that communicates the license terms and conditions to the user. In some cases, the approval package may be a document transmitting in an email message, a downloaded application that contains the terms and conditions, or other communication. In some cases, the approval package may be a webpage or other user interactive interface component that the user may read and agree with the terms and conditions.

In some cases, the approval package may include a mechanism to pay for the software to be downloaded. The payment scheme may be a one-time payment for which a license may be granted. In some cases, the payment scheme may be a renewable license that may be renewed every month, year, or other time period. In still other cases, the payment scheme may be based on usage, such as the number of operations performed by the executable code. Many other types of payment schemes may also be used.

If the user does not accept the license in block 316, the process may exit in block 318 without transmitting the executable code. If the user does accept the license in block 316, the acceptance may be transmitted in block 320 and received by the distribution server 304 in block 322.

The distribution server 304 may transmit the executable code in block 324, which may be received in block 326 and executed in block 328 by the client device 302.

In block 330, the client device 302 may request a monitoring system, and the request may be received in block 332 by the distribution server 304.

In some embodiments, the distribution mechanism for the executable code may be separate from the distribution mechanism for the monitoring system. For example, the executable code may be distributed using an open source code distribution website or application, while the monitoring system may be distributed through a private party's website. Embodiment 300 illustrates a case where both the executable code and monitoring system may be distributed through the same distribution mechanism.

After receiving the request in block 332, the distribution server 304 may transmit an approval package in block 334, which may be received in block 336. If the user does not accept the license in block 338, the process may return to block 328 where the user may enjoy the executable code without the monitoring system. If the user accepts the monitoring system license in block 338, the approval package may be transmitted in block 340 to the distribution server 304, which may receive the approval package in block 334.

Based on approval package in block 342, the distribution server 304 may transmit a monitoring system in block 344, which may be received by the client device 302 in block 346. The monitoring may begin in block 348. Because of the monitoring, the client device 302 may transmit monitored parameters in block 350 and received by the optimization server 306 in block 352.

In some embodiments, the monitoring mechanism may be included in the original executable code received in block 326, but the monitoring function may be turned off. In such an embodiment, the monitoring system received in block 346 may be a key or other authorization that may enable the monitoring system to function.

Figure 4:
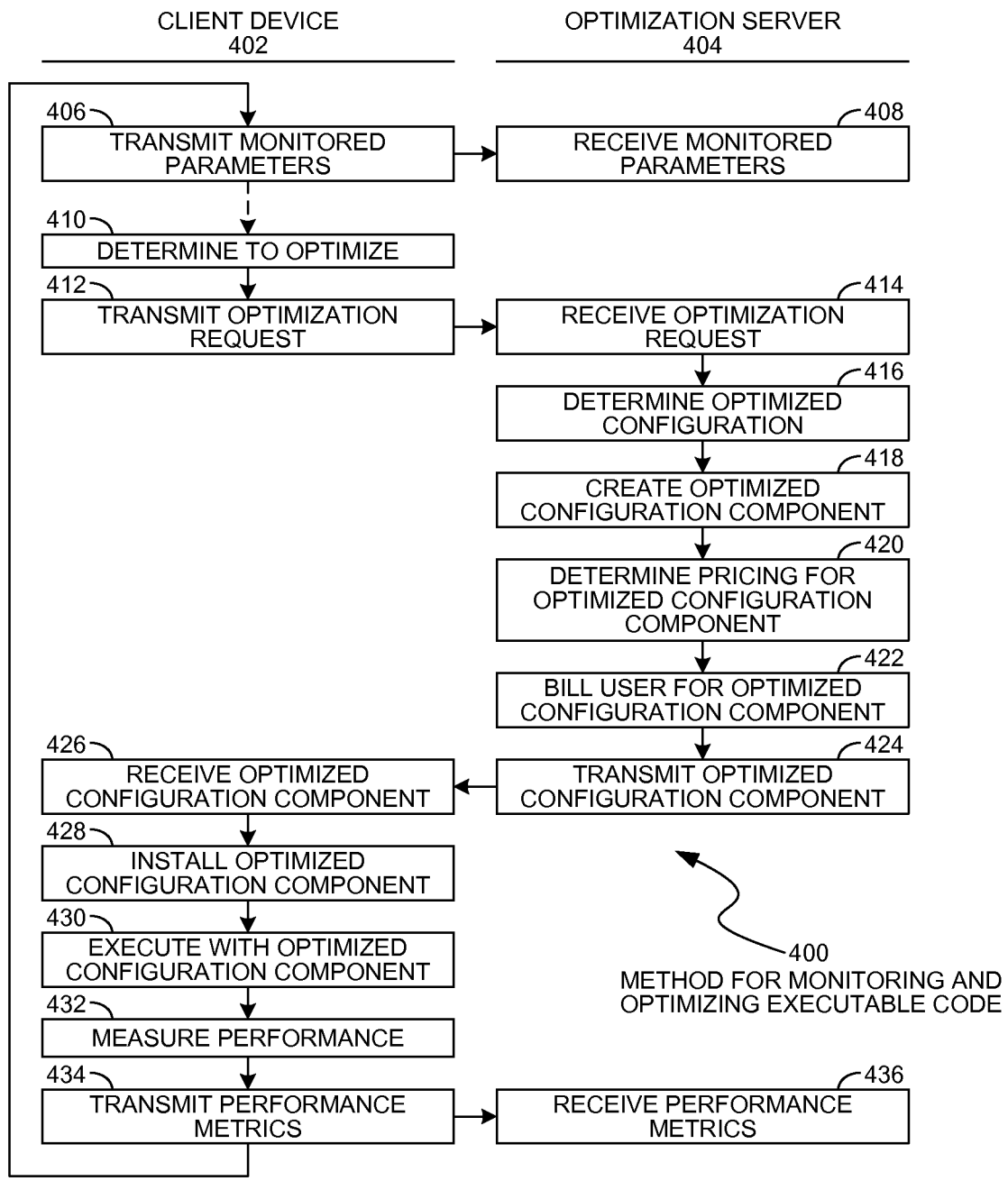
FIG. 4 is a flowchart illustration of an embodiment showing a method for monitoring and optimizing executable code.

FIG. 4 is a flowchart illustration of an embodiment 400 showing a method for monitoring and optimizing executable code. Embodiment 400 illustrates the operations of a client device 402 in the left hand column and an optimization server 404 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a method that may be performed between a client device 402 and an optimization server 404 for creating an optimized configuration component. Embodiment 400 illustrates a method for optimizing executable code on a client device 402 by monitoring the executable code, analyzing the collected data, and creating an optimized configuration component.

In block 406, the client device 402 may transmit monitored parameters to the optimization server 404, which receives the monitored parameters in block 408. The data collection may operate for some time until a determination may be made in block 410 to perform an optimization.

A determination may be made in block 410 that an optimization may be performed. The determination may be made in different manners using different embodiments. In some cases, a lightweight monitoring system may operate on the client device 402 and may indicate that an optimization may be performed when the monitored data cross a predetermined threshold, for example. In another case, a user may manually request an optimization.

An optimization request may be transmitted in block 412 from the client device 402 to the optimization server 404, which may receive the optimization request in block 414.

Based on the collected data, an optimized configuration may be determined in block 416. The optimized configuration may be determined by optimizing a mathematical model of the executable code using the data gathered from the client device 402.

Based on the optimized configuration, an optimized configuration component may be created in block 418. The optimized configuration component may be static settings, executable components, or other modifications to the monitored executable code.

The pricing for the optimized configuration component may be determined in block 420 and the user may be billed in block 422. Many different pricing schemes may be used, including subscriptions, predefined number of uses, pay-per-use, pay for performance, and other models. An example of a pay for performance model may be illustrated in embodiment 500 presented later in this specification.

In some embodiments, the pricing may be made per device, where a consumer may pay a specific charge for each device using the optimization. Other embodiments may include pricing per core, where a charge may be made for each processor core on a device that uses the optimization. In some embodiments, a pricing may be made per instance of the optimization component that is being used.

The optimized configuration component may be transmitted to the client device in block 424 and received in block 426. The optimized configuration component may be installed in block 428 and executed with the executable code in block 430.

The performance of the executable code with the optimized configuration component may be measured in block 432 and the performance metrics may be transmitted in block 434. The optimization server 404 may receive the performance metrics in block 436. The performance metrics may be used to update the mathematical model of the executable code as well as other functions.

The client device 402 may resume the monitoring operation in block 406. In some cases, the monitoring of the client device 402 may be reduced to a low level after optimization.

In some embodiments, the optimized configuration component may include parameters that may be monitored, as well as boundary conditions that may trigger further optimization. Such updated boundary conditions may be used when a request for a second optimization may be identified in block 410.

Figure 5:
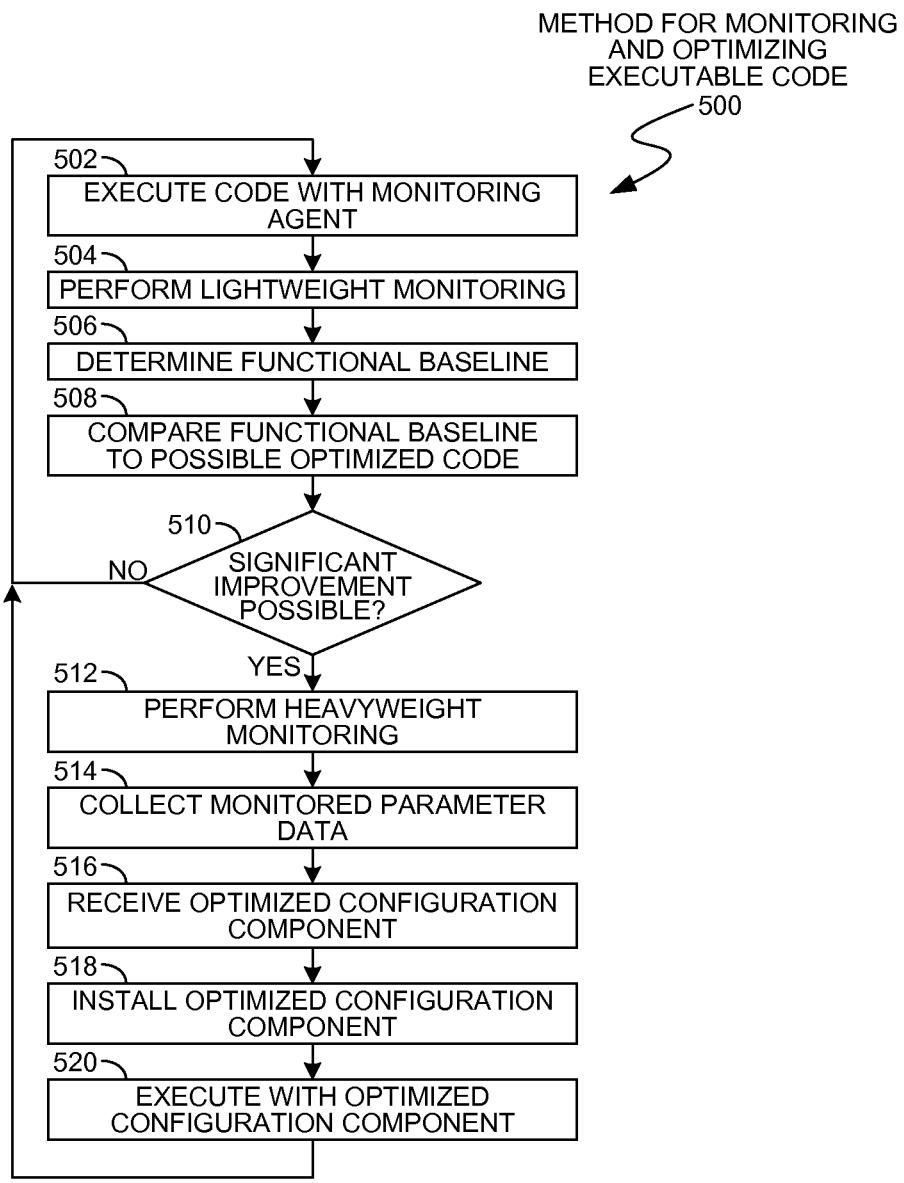
FIG. 5 is a flowchart illustration of an embodiment showing a method for monitoring and optimizing with two levels of monitoring.

FIG. 5 is a flowchart illustration of an embodiment 500 showing a method for monitoring and optimizing executable code. Embodiment 500 illustrates the operations of a client device that may perform different levels of monitoring to identify a potential opportunity for optimization, as well as to gather information for monitoring.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates a method in which two levels of monitoring may be used to in an optimization sequence. The lightweight monitoring may be used as a low level monitoring mechanism that may identify conditions for an optimization. When the optimization process begins, a heavyweight monitoring may gather additional data that may be used for optimization. After optimization, the lightweight monitoring may resume.

In block 502, execution may occur with a monitoring agent, which may collect data using a lightweight monitoring scheme in block 504. The lightweight monitoring may collect a subset of data that may be used to generate a functional baseline for the system in block 506. The functional baseline may represent the current performance of the system given its workload.

The functional baseline may be evaluated in block 508 to determine if optimization may provide an advantage. The comparison may involve estimating the possible performance if an optimization were to be performed.

If there is no significant optimization possible in block 510, the process may return to block 502 to continue lightweight monitoring.

If significant improvements are possible through optimization in block 510, the optimization process may begin. The optimization process may involve heavyweight monitoring in block 512, where monitored parameter data may be collected in block 514 and transmitted to an optimization server.

An optimized configuration component may be received in block 516 and installed in block 518. The system may begin execution with the optimized configuration component in block 520 and return to block 502 to continue operation with lightweight monitoring.

Figure 6:
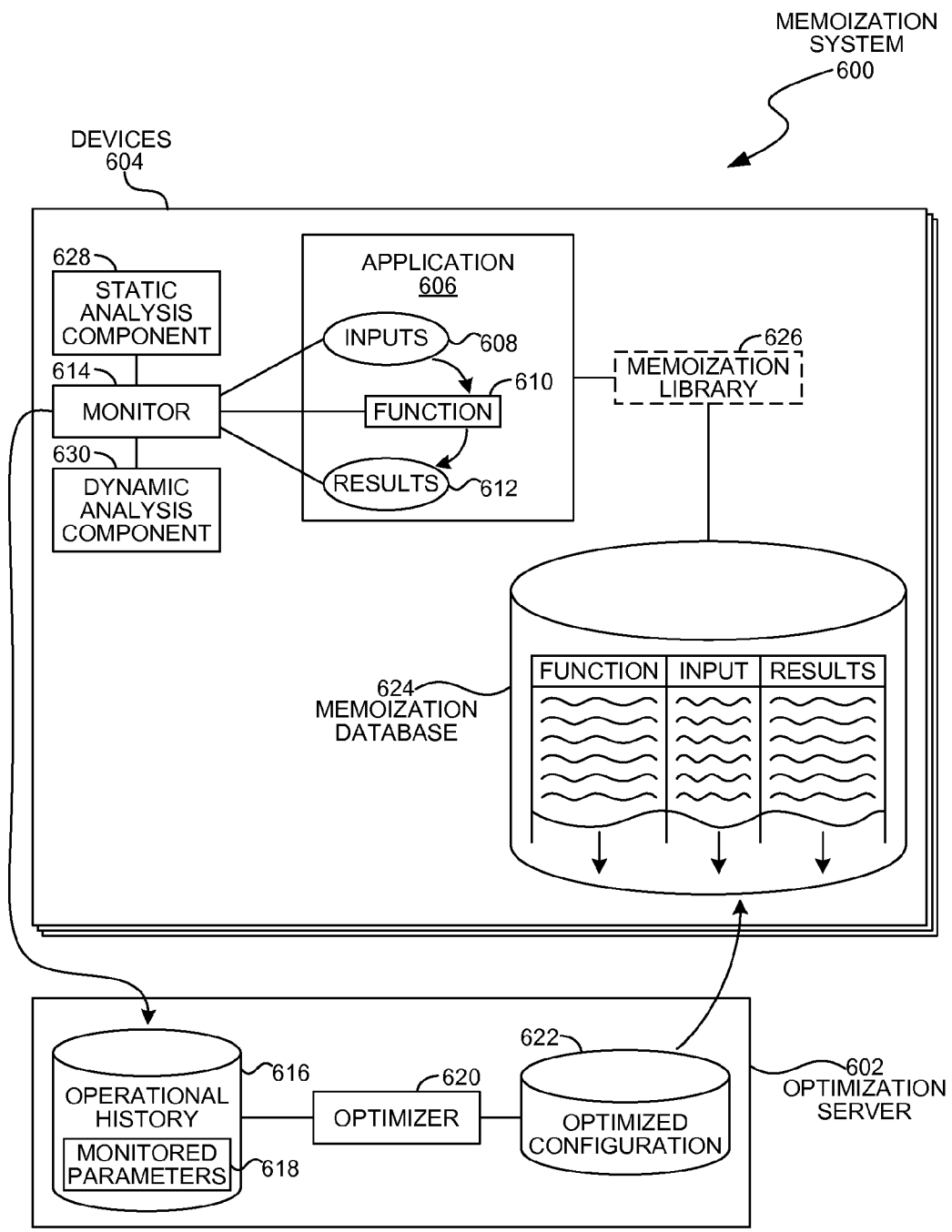
FIG. 6 is a diagram illustration of an embodiment showing a system for offline memoization optimization.

FIG. 6 is a diagram illustration of an embodiment 600 that illustrates a memoization system as one form of optimization. Memoization may be considered as one of many optimization mechanisms as described above.

Memoization is a caching technique where the results of previously calculated functions are stored. When the function is encountered a second time, the results may be used directly, rather than re-calculating the results. Memoization can result in tremendous increases in performance in some cases, as the executable code may 'learn' or perform more quickly over time.

Embodiment 600 illustrates a mechanism by which an offline or remote optimization server 602 may participate in memoization. The optimization server 602 may collect data from various devices 604 to identify which functions may be appropriate for memoization. In some cases, the optimization server 602 may merely identify the functions to memoize, and in other cases, the optimization server 602 may also determine the memoized results of the functions.

The optimization sever 602 may receive results from many different devices 604 and analyze the aggregated results. In such embodiments, the optimization server 602 may analyze much more data than could be analyzed on a single device.

A function may be identified as memoizable when memoization meets a set of objectives. The objectives may be to increase throughput, reduce cost, or other objectives. In many cases, a limited cache or database of memoized functions may be available, forcing the optimization to select a subset of available functions for memoizing.

An application 606 may execute on the devices 604. Within the application 606, a set of inputs 608 may be passed to a function 610, which may produce results 612. As the application 606 executes, a monitor 614 may collect data. The monitor 614 may collect various monitored parameters 618 that may be transmitted to the optimization server 602 and stored in an operational history database 616.

An optimizer 620 may analyze the operational history database 616 to generate an optimized configuration 622. The optimized configuration may be one or more records that may be transmitted to the devices 604 and stored in a memoization database 624. The memoization database 624 may contain records with identifiers for specific functions, along with the inputs and results for the functions.

The memoization records may include various metadata about the functions. For example, the metadata may include whether or not a specific function is appropriate for memoization. In some cases, the metadata may identify specific conditions for memoizing a function, such as memoizing a function with only a subset of inputs and not memoizing for other sets of inputs.

In some embodiments, the metadata may include a binary indicator that indicates whether or not a specific function may be memoized or not. In some instances, the metadata may include a definition of which instances a function may or may not be memoized. For example, some embodiments may have a descriptor that permits memoization for a function with a set of inputs, but does not permit memoization with a different set of inputs. In another example, the metadata may indicate that the function may be memoized for all inputs.

In some embodiments, the metadata may indicate that a specific function is not to be memoized. Such metadata may affirmatively show that a specific function is not to be memoized. The metadata may also indicate that a different function is to be memoized.

When the application 606 is executed on the device 604, a memoization library 626 may be a set of routines that may be called to implement memoization. The memoization library 626 may be called with each memoizable function, and the memoization library 626 may perform the various functions for memoizing a particular function, including managing the various inputs and results in the memoization database 624.

In some cases, the memoization library 626 may populate the memoization database 624. In one such example, the optimization server 602 may identify a specific function for memoization. Once identified, the memoization library 626 may store each call to the function, along with its inputs and results, thus populating the memoization database 624.

In other cases, the memoization database 624 may be populated by the optimization server 602. In such cases, the memoization library 626 may not add information to the memoization database 624.

In one such embodiment, the optimization server 602 may collect data from a first device and transmit an updated configuration 622 to a second device. In such an embodiment, the device receiving the records in the memoization database 624 may not have been the device that generated the data used to create the record.

The optimization server 602 may transmit the optimized configuration 622 to the devices 604 through various mechanisms. In some cases, the optimization server 602 may have a push distribution mechanism, where the optimization server 602 may transmit the optimized configuration as the configuration becomes available. In some cases, the optimization server 602 may have a pull distribution mechanism, where the devices 604 may request the optimized configuration, which may be subsequently transmitted.

The monitored parameters 618 gathered by the monitor 614 may include various aspects of the function 610. For example, the monitored parameters 618 may include information about the amount of work consumed by the function 610. Such information may be expressed in terms of start time and end time from which elapsed time may be computed. In some cases, the amount of work may include the number of operations performed or some other expression.

Other aspects of the function 610 may include the inputs 608 and results 612 for each execution of the function. The inputs and results of the function 610 may be stored and compared over time. Some embodiments may compare the inputs 608 and results 612 over time to determine if a function is repeatable and therefore memoizable.

Some embodiments may include a static analysis component 628 and dynamic analysis component 630 which may gather static and dynamic data, respectively, regarding the operation of the function 610. A static analysis component 628 may analyze the function 610 prior to execution. One such analysis may classify the function 610 as pure or not pure. A pure function may be one in which the function has no side effects and therefore should return the same value for a given input. Impure functions may have side effects and may not return the same results for a given input.

In some embodiments, the purity of a function may be determined based on static analysis of the function. In other embodiments, the purity may be determined through observations of the behavior of the function. In such embodiments, the repeated observation of the function may be used to determine a statistical confidence that the function may be pure. Such a dynamic evaluation of function purity may be limited to a set of conditions, such as when a first set of inputs are applied, but purity may not be true when a second set of inputs are applied, for example.

The static analysis component 628 may create a control flow graph for the application 606, which may be included in the monitored parameters 618. The optimizer 620 may traverse the control flow graph as part of a process of selecting a function for memoization.

A dynamic analysis component 630 may analyze the actual operation of the function 610 to generate various observations. In some cases, the dynamic analysis component 630 may measure the frequency the function 610 was called with the various inputs 608. The dynamic analysis may also include performance measurements for the function 610.

The optimized configuration 622 may be distributed to the devices 604 in many different forms. In some cases, the optimized configuration 622 may be distributed in a file that may be transmitted over a network. In other cases, the optimized configuration 622 may be transmitted as records that may be added to the memoization database 624.

The example of embodiment 600 illustrates several client devices 604 that may provide data to an optimization server 602. In a typical deployment, the client devices may be executing different instances of the application 606, each on a separate device.

In another embodiment, separate instances of the application 606 may be executing on different processors on the same device. In one version of such an embodiment, a monitor 614 may be operating on a subset of the processors and the remaining processors may be executing the application 606 without the monitor 614 or with a different, lightweight monitor. In such an embodiment, some of the processors may execute the application 606 with memoization but without the monitor 614.

Figure 7:
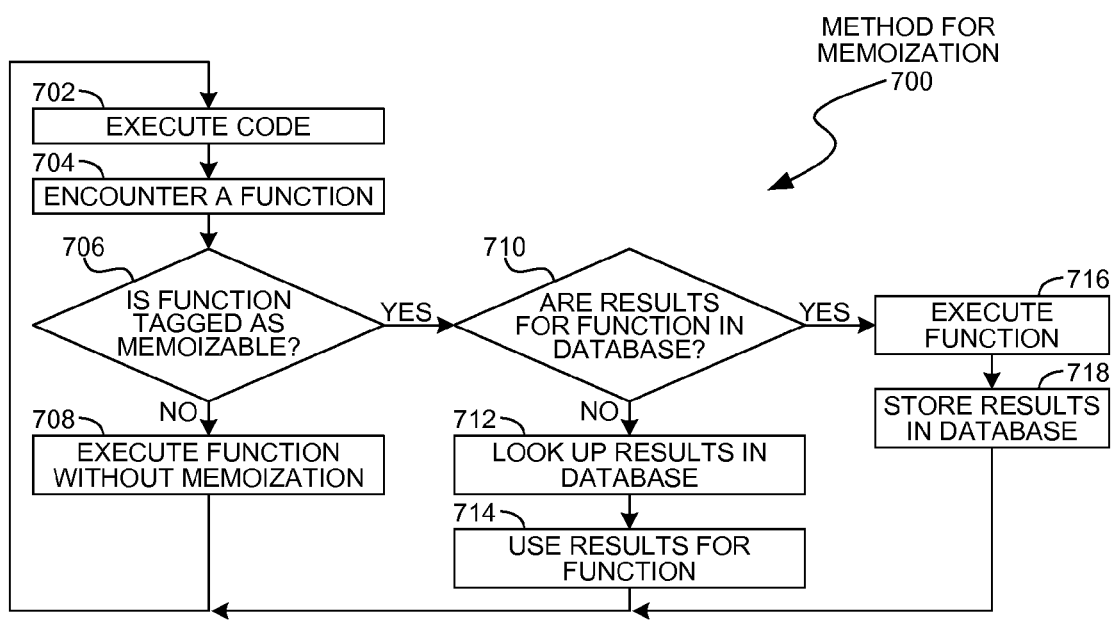
FIG. 7 is a flowchart illustration of an embodiment showing a method for memoization.

FIG. 7 is a flowchart illustration of an embodiment 700 showing a method for memoization. The method of embodiment 700 may illustrate a memoization mechanism that may be performed by an execution environment by monitoring the operation of an application and applying memoization.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 illustrates a method that may be performed in a virtual machine, operating system, or other execution environment. The execution environment may memoize any function that has a record in a memoization database by monitoring execution, detecting that the function has been identified for memoization, and then memoizing the function.

The execution environment may be a virtual machine, operating system, or other software construct that may execute an application. In some cases, the execution environment may automatically memoize a function when that function is identified in a memoization database. In some embodiments, such an execution environment may receive optimization information from a process that identifies functions to memoize, and such a process may execute on the same device or a different device from the execution environment.

The application code may be executed in block 702. During execution, a function may be encountered in block 704. If the function has not been tagged as memoizable in block 706, the function may be executed in block 708 without any memoization. The process may return to block 702 to continue execution in block 702.

If the function has been tagged as memoizable in block 706, and the results are in the memoization database in block 710, the results may be looked up in the database in block 712 and returned as the results for the function in block 714. The process may return to block 702 to continue execution without having to execute the function.

When the process follows the branch of blocks 710-714, the memoization mechanism may avoid the execution of the function and merely look up the answer in the memoization database. Such a branch may yield large improvements in processing speed when the computational cost of the function is large.

If the results are not found in the database in block 710, the function may be executed in block 716 and the results may be stored in the memoization database in block 718. The process may return to block 702 to continue execution.

The branch of blocks 716-718 may be performed the first time a function executes with a given input. Each time after the function is called with the same input, the branch of 710-714 may be executed, thus yielding a performance improvement.

The application code executed in block 702 may be any type of executable code. In some cases, the code may be an actual application, while in other cases, the executable code may be an operating system, execution environment, or other service that may support other applications. In such cases, the process of embodiment 700 may be used to speed up execution of the operating system or execution environment.

Figure 8:
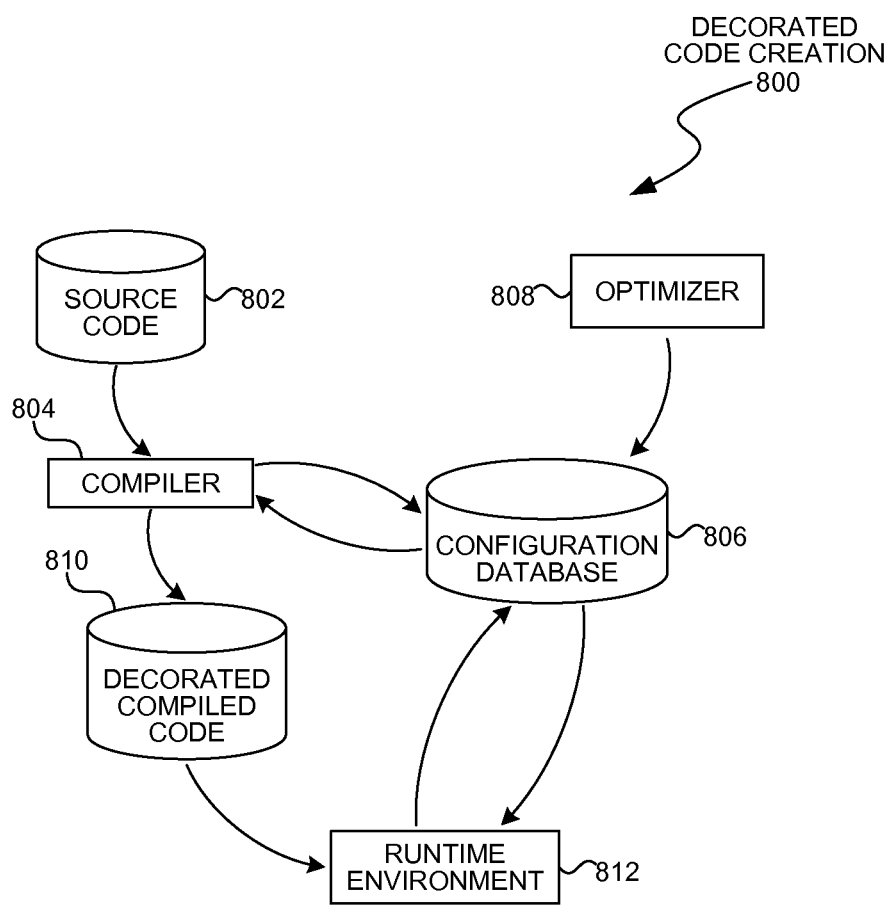
FIG. 8 is a diagram illustration of an embodiment showing a mechanism for decorating compiled code.

FIG. 8 is a diagram illustration of an embodiment 800 showing the creation of decorated code. Embodiment 800 illustrates how a configuration database may be used during compilation to annotate, decorate, or otherwise modify source code prior to execution.

Embodiment 800 is an example method by which code may be analyzed and decorated prior to execution. The process of embodiment 800 may be performed during compilation, or during some other pre-execution process. During compiling, the process may receive source code and emit object code. In such a case, the beginning code may be source code, intermediate code, or other form of code that may be compiled into a lower level code.

In some cases, the process of embodiment 800 may be performed in a just in time environment. For example, the process of embodiment 800 may be performed by a just in time compiler to add memoization decorations to intermediate code at runtime. In such cases, a configuration database may be downloaded and decorations added to an application close to real time.

Embodiment 800 may be performed on precompiled code in some cases. For example, object code may be decompiled and then analyzed using embodiment 800. In such a case, the memoization decorations may be added to existing executable code.

Source code 802 may be compiled by a compiler 804. During compilation, an examination of each function call may be performed. When a function call may be found in a configuration database 806, the code may be decorated to produce decorated compiled code 810.

The decorated compiled code 810 may be consumed by the runtime environment 812.

An optimizer 808 may produce the configuration database 806. In some cases, the optimizer 808 may consume tracing code that may be generated by interpreted or compiled code, while the configuration database 806 may be consumed by compiled code.

The decorations performed during compiling may be merely flagging a function call that a record in the configuration database 806 may exist. In such an embodiment, the runtime environment 812 may attempt to look up the function call in the configuration database 806.

In other embodiments, the decorations may include adding instructions to the decorated compiled code 810 that perform a lookup against the configuration database 806.

In still other embodiments, the decorations may include information from the configuration database 806 that may be used by the runtime environment 812. In such embodiments, the decorations may include all of the information regarding the modified function call and the runtime environment 812 may not query the configuration database 806 at runtime.

The source code 802 may be human readable source code which may produce intermediate code or machine executable code. In some cases, the source code 802 may be intermediate code that may be compiled to machine executable code.

The compiler 804 may be a just-in-time compiler that may perform compilation at runtime in some embodiments.

Figure 9:
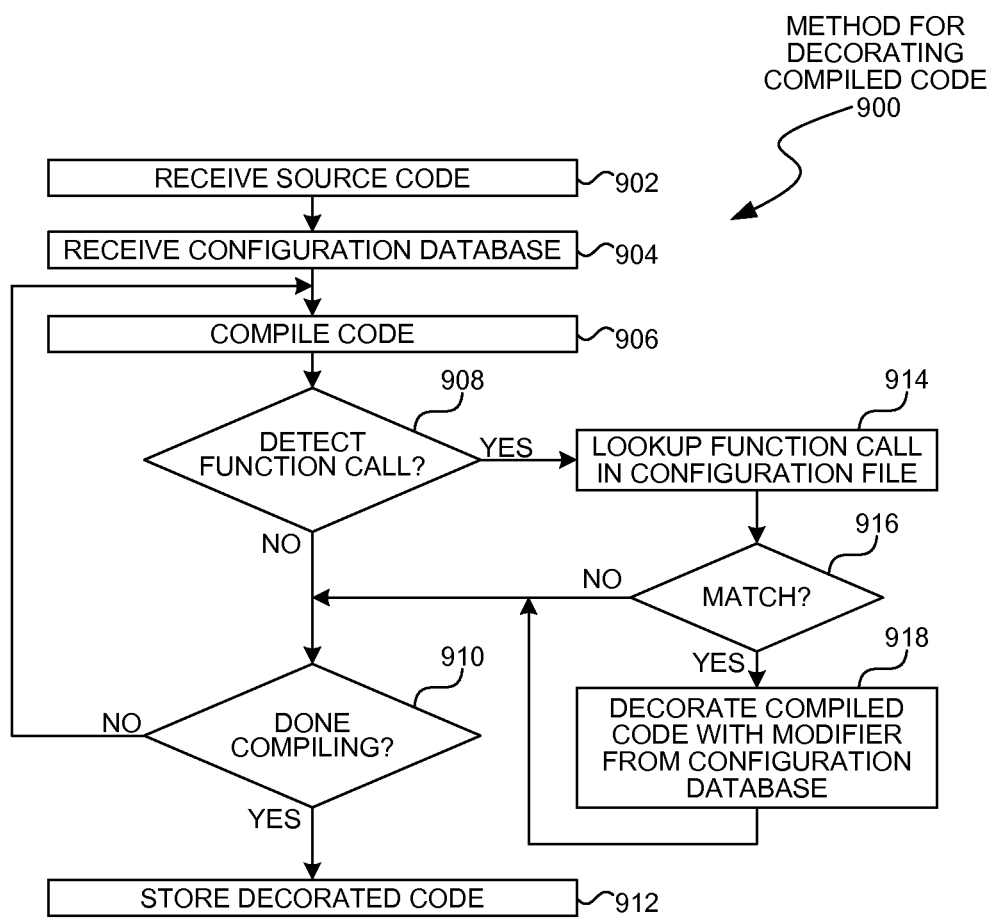
FIG. 9 is a flowchart illustration of an embodiment showing a method for decorating compiled code.

FIG. 9 is a flowchart illustration of an embodiment 900 showing a method for decorating compiled code. Embodiment 900 may represent the operations of a compiler, such as compiler 804 in embodiment 800.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 may process source code during compilation to identify function calls and decorate the compiled code with annotations regarding memoization of the function call. The decorations may be hooks or identifiers that may be processed by a runtime environment. In some cases, the decorations may be executable code or parameters that may cause memoization to occur according to a configuration database.

Source code may be received in block 902. The source code may be human readable source code, intermediate code, or other code that may be compiled.

The configuration database may be received in block 904.

Compilation may be started in block 906.

If a function call is not detected in block 908 and the compiling has not completed, the process loops back to block 906. When the compiling has completed in block 910, the decorated compiled code may be stored in block 912.

When a function call is detected in block 908, the function call may be looked up in the configuration file in block 914. When there is no match in block 916, the process may return to block 910. When there is a match, the compiled code may be decorated in block 918.

In some embodiments, the decorations may be executable commands, sequences, or other code that cause the function call to be memoized according to the configuration database. Such embodiments may not perform a look up to the configuration database at runtime. In other embodiments, the decorations may include executable code that performs a look up a configuration database at runtime. In still other embodiments, the decorations may be identifiers that may assist a runtime environment in identifying a function call that may have an entry in the configuration database.

Figure 10:
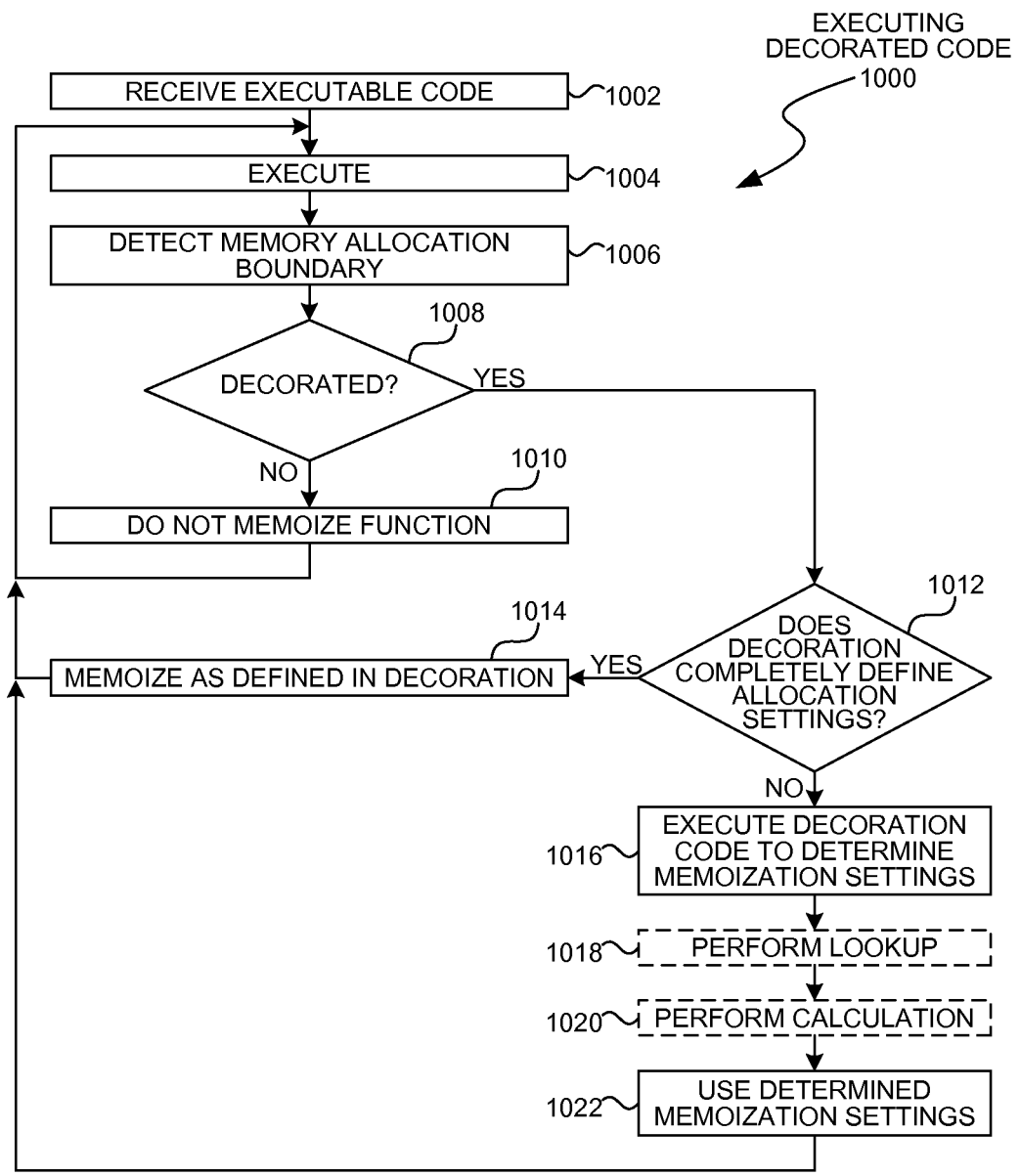
FIG. 10 is a flowchart illustration of an embodiment showing a method for executing decorated code.

FIG. 10 is a flowchart illustration of an embodiment 1000 showing a method for executing decorated code. Embodiment 1000 may illustrate the operations of a client device that executes code that may have been created by the process of embodiment 800.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1000 illustrates a method by which decorated code may be executed. In some cases, the decorated code may be compiled code that may contain decorations or additions to the code at places where memory allocation may occur. In other cases, the decorated code may be interpreted code to which decorations may have been added.

The executable code may be received in block 1002 and may begin executing in block 1004.

During execution, a function call may be detected in block 1006. If the function call is not decorated in block 1008, the function may not be memoized in block 1010 and the process may return to block 1004.

If the function call is decorated in block 1010, the decoration may be evaluated to determine how to memoize the function. In some cases, the decoration may fully define how to memoize the function. For example, the decoration may define that the function may be memoized in certain situations but not in other situations. When the decoration completely defines memoization settings in block 1012, those allocation settings may be used in block 1014.

In other cases, the decoration code may be executed in block 1016 to determine the memoization settings. In some cases, a lookup may be performed in block 1018. In some cases, the decoration code may define a calculation that may be performed in block 1020. In one example of such a calculation, values that may be passed to a memozied function may be evaluated prior to memoization. The newly determined allocation settings may be used in block 1022 to perform the memoization operation.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor, said method comprising:
   receiving source code;
   receiving a configuration database;
   compiling said source code into compiled code;
   during said compiling, detecting a call for a first function;
   looking up said first function in said configuration database;
   when said first function is present in said configuration database, decorating said compiled code with a modifier corresponding to a record in said configuration database, said modifier causing memoization for said first function in a first state; and
   storing said decorated compiled code.

2. The method of claim 1, said modifier comprising executable code.

3. The method of claim 2, said executable code comprising instructions that:
   detects when a result is stored for said first function and returns said result.

4. The method of claim 2, said executable code comprising instructions that:
   calls a memoization library.

5. The method of claim 2, said executable code comprising instructions that:
   causes input values to said first function to be evaluated prior to memoization.

6. The method of claim 5, said input values being said first state for which said first function is memoized.

7. The method of claim 2, said executable code comprising instructions that:
   causes a lookup in said configuration database during execution.

8. The method of claim 1, said modifier being consumable by an execution environment.

9. The method of claim 1, said source code being intermediate code.

10. The method of claim 1, said compiled code being intermediate code.

11. The method of claim 1, said source code being decompiled code.

12. The method of claim 1, said modifier not causing memoization for said first function in a second state.

13. The method of claim 1, said first state comprising a first set of input parameters for said first function.

14. The method of claim 13, said first state further comprising a first set of external parameters, said external parameters being parameters not included in said first set of input parameters.

15. The method of claim 14, said first set of external parameters comprising a calling function identifier, said calling function identifier being a function that calls said first function.

16. A system comprising:
   a processor; and
   a pre-execution analyzer executing on said processor, said pre-execution analyzer that:
      receives source code;
      receives a configuration database;
      compiles said source code into compiled code;
      during said compiling, detects a call for a first function;
      looks up said first function in said configuration database;
      when said first function is present in said configuration database, decorates said compiled code with a modifier corresponding to a record in said configuration database, said modifier causing memoization for said first function in a first state; and
      stores said decorated compiled code.

17. The system of claim 16, further comprising:
   a configuration database manager that:
      receives said configuration database.

18. The system of claim 17, said configuration database manager that further:
   receives an update to said configuration database; and
   updates said configuration database.

19. The system of claim 18, said configuration database manager that further:
   communicates with a remote server; and
   receives said update from said remote server.

20. The system of claim 16, said pre-execution analyzer being a compiler.

* * * * *